United States Patent

Fagel

[11] 3,927,910
[45] Dec. 23, 1975

[54] RESILIENTLY LATERALLY SHIFTABLE AXLE MOUNTING BOGIE

[75] Inventor: Roger Fagel, Marcinelle, Belgium

[73] Assignee: Ateliers de Constructions Electriques de Charleroi (ACEC)

[22] Filed: June 7, 1974

[21] Appl. No.: 477,290

[30] Foreign Application Priority Data
June 15, 1973 Belgium .................................. 5161

[52] U.S. Cl. .............. 295/36 R; 105/171; 105/222; 295/12; 295/36 A; 295/44
[51] Int. Cl.² ................. B60B 35/00; B60B 37/10; B61F 5/30; B61F 5/46
[58] Field of Search .... 105/222, 171; 295/12, 36 R, 295/36 A, 10, 44

[56] References Cited

UNITED STATES PATENTS

| | | | |
|---|---|---|---|
| 1,445,223 | 2/1923 | Lockett | 295/12 |
| 2,047,725 | 7/1936 | Brunner | 105/222 X |
| 2,139,070 | 12/1938 | Dobbins | 295/12 X |
| 3,399,634 | 9/1968 | Zunich | 105/222 X |

FOREIGN PATENTS OR APPLICATIONS

| | | | |
|---|---|---|---|
| 566,364 | 11/1923 | France | 105/171 |
| 772,041 | 8/1934 | France | 295/12 |
| 779,714 | 1/1935 | France | 295/36 R |
| 844,968 | 5/1939 | France | 105/171 |
| 570,434 | 2/1933 | Germany | 295/10 |
| 637,924 | 11/1936 | Germany | 295/36 A |
| 685,283 | 12/1939 | Germany | 295/36 A |
| 302,930 | 11/1932 | Italy | 295/12 |

*Primary Examiner*—Robert J. Spar
*Assistant Examiner*—Howard Beltran
*Attorney, Agent, or Firm*—Raymond A. Robic; Peter G. Mack; Arthur Schwartz

[57] ABSTRACT

Resilient wheel for railroad bogie running at high speed, comprising, a rim having a hub adapted to be rotated around the extremity of a shaft capable of being resiliently displaced only in a longitudinal direction, the other extremity of the shaft carrying an opposite wheel. The rim is provided with a tire surrounded by a metallic strip provided with a flange necessary for rolling on a rail. A disc is adapted to slide perpendicularly to the shaft between two plates connected to the rim. Resilient means are adapted to be compressed during the longitudinal displacement of the shaft. The resilient means are so conceived as to provide a non-linear law of the deformation strain as a function of the longitudinal displacement of the shaft.

6 Claims, 2 Drawing Figures

RESILIENTLY LATERALLY SHIFTABLE AXLE MOUNTING BOGIE

The present invention relates to vehicles adapted to run at very high speed on railroad tracks.

One object of the invention is the provision of a resilient wheel driven by an independent motor, the resiliency being exerted in the vertical direction and in the horizontal direction.

According to the invention, the resilient wheel comprises a rim the hub of which is adapted to rotate around one end of a shaft capable to be displaced only in a longitudinal direction, the other end of the shaft carrying an opposite wheel, the rim being provided with a tire surrounded by a metal strip or tread having a flange or bead designed for rolling on a rail and a disc adapted to slide perpendicularly to the shaft between two plates connected to the rim. Resilient means are provided for being compressed during the longitudinal displacement of the shaft. The resilient means are so conceived as to obtain a non-linear law of the deformation strain as a function of the longitudinal displacement of the shaft.

A preferred embodiment of the invention will be described below with reference to the accompanying drawing in which.

Figure 1:
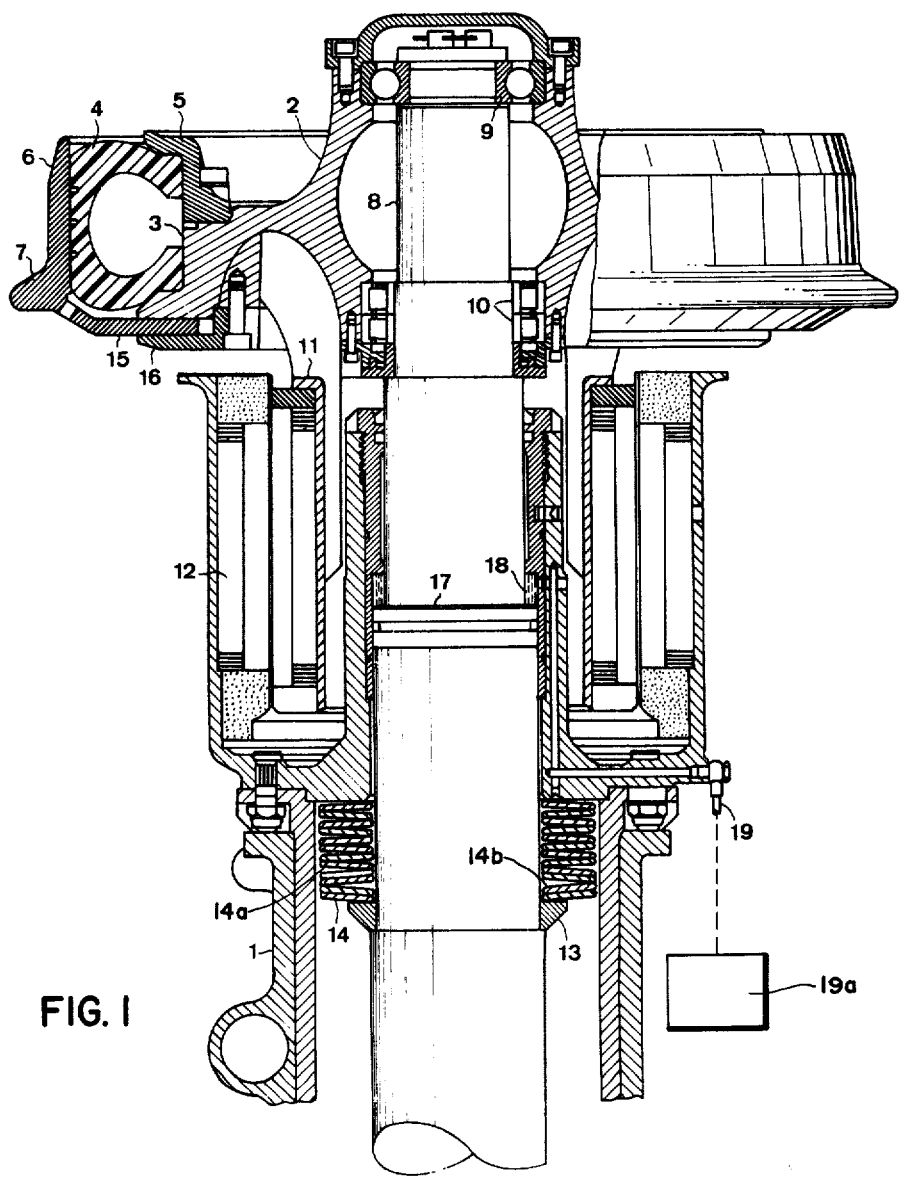
FIG. 1 is a fragmentary view, partly in section, of an axle according to the present invention.

FIG. 1 shows a wheel adapted to be mounted on a bogie 1 supporting two successive carriages of a lift of carriages running at high speed. The wheel comprises a hub 2 provided, at its periphery, with a rim 3 on which is mounted a tire 4. Rim 3 comprises a removable part 5 for the fixing and the removing of the tire 4. Around tire 4 is arranged a metal strip or tread 6 provided with a flange or bead 7 adapted to roll on a rail. The wheel may rotate around a shaft 8 by means of rollings 9 and 10. The tire is directly coupled to a rotor 11 of an asynchronous cage motor the stator 12 of which is fixed to the frame of the bogie 1.

The strip 6 is provided with a disc 15 adapted to slide between the outer face of rim 3 and an annular plate 16 in such a way as to permit to the resiliency of the tire to be exerted in the vertical direction.

Figure 2:
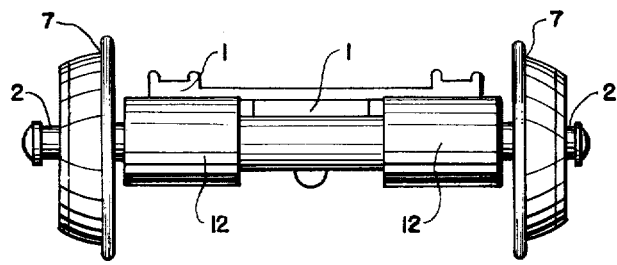
FIG. 2 is a schematic illustration of the axle supporting a conventional bogie frame.

It will be apparent to those skilled in the art that the axle of the invention may support any suitable bogie frame of a type known in the art, as illustrated schematically in FIG. 2.

According to another characteristic of the invention, the resilient means are composed of a piling of resilient rings or washers resting, on the one hand, on a fixed part of the frame of the bogie equipped with the resilient wheel and, on the other hand, on an abutment placed on the shaft, the piling being not uniform in its composition.

Thus, between an abutment 13 of the shaft 8 and the fixed part of the entire assembly is disposed a piling of resilient rings or washers 14, for example Belleville each having a convex side 14a and a concave side 14b, rings arranged facing each other by pairs except that one of the asemblies is doubled in order to obtain a non-linear law of the crushing of the rings as a function of the longitudinal displacement of the shaft.

According to a further characteristic of the invention, the shaft is provided with a shoulder acting as a piston which moves inside an oil chamber communicating, through a bumper element, with the oil chamber corresponding to the opposite wheel mounted on the same shaft.

Thus, shaft 8 is provided with a shoulder 17 acting as a piston in an annular oil chamber 18. Chamber 18 is connected, by pipe means 19, through a bumper element 19a to the oil chamber corresponding to the opposite wheel. It is thus obtained an absorption of the longitudinal movements of shaft 8.

It should be noted that numerous variations may be brought to the construction of the above-described resilient wheel without departing from the scope of the present invention.

I claim:

1. An axle arrangement for a high speed railroad bogie comprising:
   a. a flanged wheel carried by a longitudinally displaceable axle supporting a bogie frame, said axle being displaceable with respect to said bogie frame;
   b. an abutment on said axle;
   c. a shoulder fixed to said bogie frame;
   d. resilient means coupled between said abutment and said shoulder;
   e. said resilient means including a plurality of separate, contiguous, resilient rings on a common axis, one portion of said rings being arranged in a first pattern, another portion of said rings being arranged in a second pattern, whereby said resilient means exerts a non-linear resistance to longitudinal displacements of said axle.

2. The invention of claim 1 wherein each resilient ring includes a convex side and a complementary concave side, the resilient rings of said one portion being so arranged that the concave side of each ring faces the concave side of the next adjacent ring and the convex side of each ring faces the convex side of the next adjacent ring, the resilient rings of said other portion being so arranged that the convex side of at least one ring faces the concave side of an adjacent ring.

3. The invention of claim 1:
   a. wherein said axle includes a further shoulder, said further shoulder defining a piston;
   b. including a sleeve associated with said piston and surrounding said axle, and said piston;
   c. wherein said piston, axle, and sleeve define an annular chamber having fluid therein;
   d. including a bumper element;
   e. including pipe means effecting communication between said annular chamber and said bumper element to effect damping of the longitudinal movements of said axle.

4. The invention of claim 1 wherein said wheel is a resilient wheel.

5. The invention of claim 1 wherein said resilient means is coupled between said abutment and said shoulder at all positions of said axle.

6. An axle arrangement for a high speed railroad bogie comprising:
   a. a flanged wheel carried by a longitudinally displaceable axle supporting a bogie frame, said axle being displaceable with respect to said bogie frame;
   b. an abutment on said axle;
   c. a first shoulder fixed to said bogie frame;
   d. resilient means coupled between said abutment and said first shoulder;
   e. said resilient means including a plurality of separate, contiguous, resilient rings on a common axis;

f. a second shoulder on said axle, said second shoulder defining a piston;
g. said piston being movable in a cylinder, said piston and cylinder defining a chamber having fluid therein;
h. a bumper element; and
i. pipe means connected between said chamber and said bumper element and effecting communication therebetween to thereby dampen longitudinal movements of said axle.

\* \* \* \* \*